(12) United States Patent
Zolfaghari

(10) Patent No.: US 8,280,325 B2
(45) Date of Patent: *Oct. 2, 2012

(54) CONFIGURABLE TRANSMITTER

(75) Inventor: Alireza Zolfaghari, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/395,014

(22) Filed: Feb. 27, 2009

(65) Prior Publication Data

US 2009/0163157 A1   Jun. 25, 2009

Related U.S. Application Data

(63) Continuation-in-part of application No. 11/474,007, filed on Jun. 23, 2006, now Pat. No. 7,869,771.

(51) Int. Cl.
*H01Q 11/12* (2006.01)
*H04B 1/04* (2006.01)
*H04M 1/00* (2006.01)

(52) U.S. Cl. .............. 455/127.3; 455/552.1; 330/171

(58) Field of Classification Search .............. 455/127.2, 455/127.3, 127.4, 552.1, 553.1; 330/154, 330/165, 171
See application file for complete search history.

(56) References Cited

U.S. PATENT DOCUMENTS

| | | | |
|---|---|---|---|
| 5,498,995 A | 3/1996 | Szepesi et al. | |
| 5,652,699 A | 7/1997 | Kim et al. | |
| 6,160,722 A | 12/2000 | Thommes et al. | |
| 6,169,683 B1 | 1/2001 | Farrington | |
| 6,359,513 B1 * | 3/2002 | Kuo et al. | 330/276 |
| 6,490,183 B2 | 12/2002 | Zhang | |
| 6,603,352 B2 * | 8/2003 | Wight | 330/251 |
| 6,744,647 B2 | 6/2004 | Cohen | |
| 6,757,183 B2 | 6/2004 | Feldtkeller et al. | |
| 6,937,096 B2 * | 8/2005 | Wight et al. | 330/251 |
| 7,102,343 B1 | 9/2006 | Brown | |
| 7,170,465 B2 | 1/2007 | Rofougaran | |
| 7,385,445 B2 | 6/2008 | Wright | |
| 7,394,397 B2 | 7/2008 | Nguyen et al. | |
| 7,403,400 B2 | 7/2008 | Stanley | |
| 7,466,566 B2 | 12/2008 | Fukumoto | |
| 7,869,771 B2 | 1/2011 | Zolfaghari | |
| 7,933,565 B2 * | 4/2011 | Lane et al. | 455/103 |

OTHER PUBLICATIONS

Office Action received for U.S. Appl. No. 11/474,007, mailed on Feb. 23, 2010, 14 pages.
Office Action received for U.S. Appl. No. 11/474,007, mailed on Jun. 10, 2009, 12 pages.
Office Action Response filed for U.S. Appl. No. 11/474,007, filed Nov. 10, 2009, 10 pages.
Office Action Response filed for U.S. Appl. No. 11/474,007, filed Aug. 23, 2010, 18 pages.
Notice of Allowance received for U.S. Appl. No. 11/474,007, mailed on Sep. 7, 2010, 7 pages.

* cited by examiner

*Primary Examiner* — Quochien B Vuong
(74) *Attorney, Agent, or Firm* — Brake Hughes Bellermann LLP

(57) ABSTRACT

According to an example embodiment, an apparatus may be provided that is configurable to operate in either a separate power amplifier configuration or a combined power amplifier configuration.

18 Claims, 13 Drawing Sheets

US 8,280,325 B2

CONFIGURABLE TRANSMITTER

CROSS-REFERENCE TO RELATED APPLICATIONS

This application is a continuation-in-part application of U.S. application Ser. No. 11/474,007, filed on Jun. 23, 2006, entitled "Multi-Band Transformer for Wireless Transmitter," hereby incorporated by reference.

BACKGROUND

Wireless transceivers are used in a wide variety of wireless systems. A wireless transceiver (transmitter and receiver) may typically include a wireless receiver for receiving and demodulating signals, and a transmitter for modulating signals for transmission. Wireless devices typically include a power amplifier coupled to the transceiver to amplify and transmit signals. Some wireless systems may also provide operation for multiple frequency bands. However, many circuits used for wireless devices are tuned or operable specifically for one band, or separate duplicate circuits may typically be used for multi-band systems. In some cases, this may require multiple circuits, e.g., one circuit for each band in the case of a multi-band transceiver, which can increase the size and cost of the circuits. Multiple power amplifiers may be connected to an output of a transmitter.

SUMMARY

Various embodiments are disclosed relating to wireless systems, and also relating to a configurable transmitter, which may, for example, be configurable to operate with either a combined power amplifier or separate power amplifiers.

DETAILED DESCRIPTION

Figure 1:
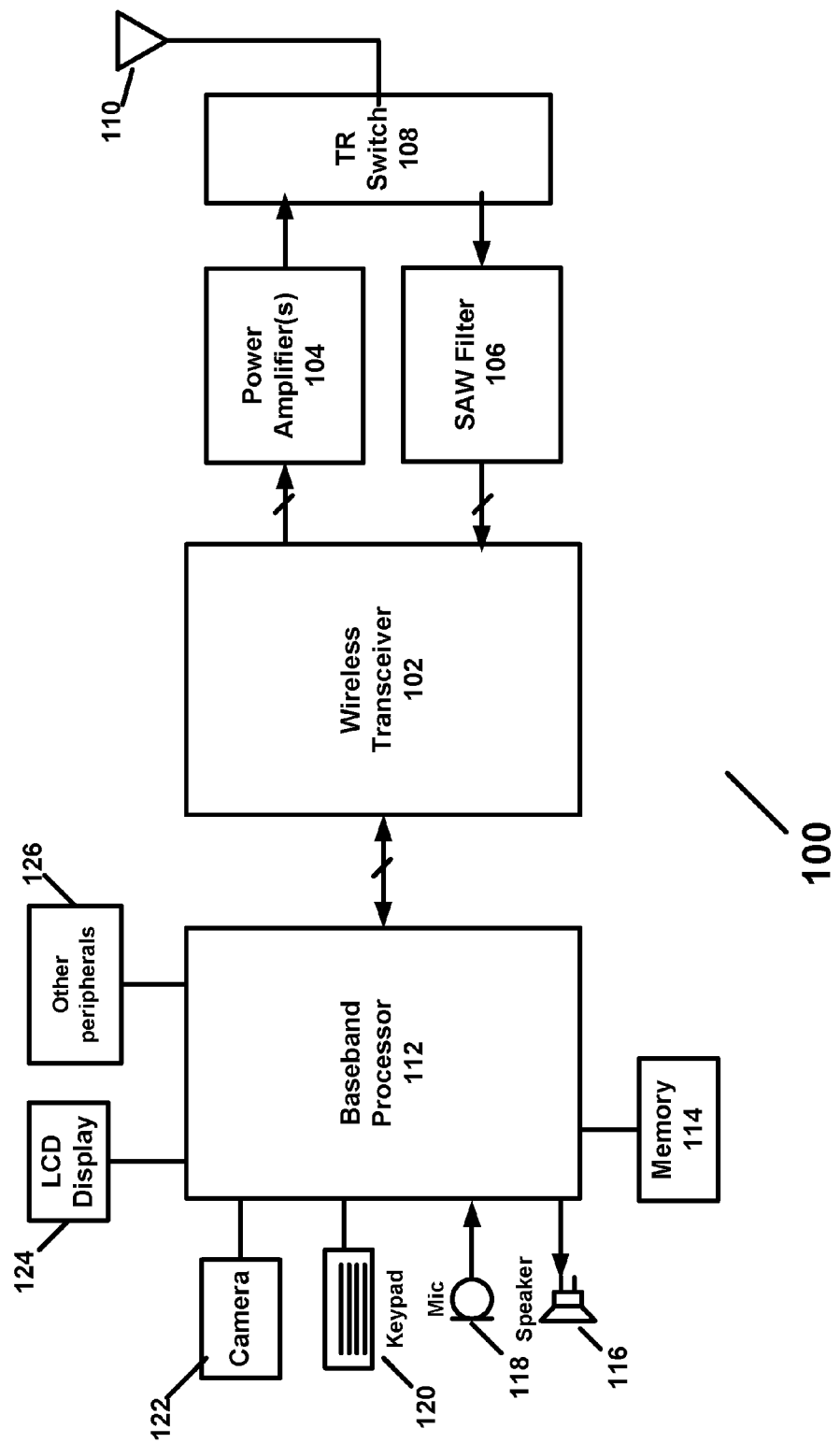
FIG. 1 is a block diagram of a wireless system according to an example embodiment.

FIG. 1 is a block diagram of a wireless system according to an example embodiment. Wireless system 100 may include a wireless transceiver (transmitter/receiver) 102 for transmitting and receiving radio or wireless signals. A baseband processor 112 is coupled to wireless transceiver 110 to perform various types of processing and overall control of system 100, and may perform other tasks. Baseband processor 112 may include a controller, and may include for example, an audio codec to process audio signals, a video or image processing codec (e.g., an MPEG4 compression and/or decompression module), and other components or blocks, not shown.

An antenna 110 may be provided to receive and transmit radio signals or electromagnetic signals. A transmitter/receiver (TR) switch 108 may select either the transmit or receive mode for the antenna 110. Signals output by wireless transceiver 102 to be transmitted may be amplified by amplifier 104 and then transmitted via antenna 110. Signals at radio frequency (RF) (which may be a wireless transmission frequency, not limited to a specific range of frequencies) may be received via antenna 110 may, for example. The received RF signals may be filtered by a SAW (surface acoustic wave) filter 106 (or other filter) and then input to transceiver 102.

At transceiver 102, the received signals may be processed or demodulated, which may include down-converting the signals to an intermediate frequency (IF) and then down-converting to baseband or other frequency, digital detection of data and other signal processing. Likewise, digital data to be transmitted may be received by transceiver 102 from baseband processor 112. Wireless transceiver 110 may modulate the digital data from baseband processor 112 onto a selected channel or frequency (or range or spectrum of frequencies) for transmission over antenna 110.

A variety of blocks or peripherals may be coupled to baseband processor 112. For example, a memory 114, such as a Flash memory or Random Access Memory (RAM), may store information. A microphone 118 and speaker 116 may allow audio signals to be input to and output by wireless system 100, such as for a cell phone or other communications device. A keypad 120 may allow a user to input characters or other information to be processed by wireless system 100. A camera 122 or other optical device may be provided to allow users to capture photos or images that may be processed and/or stored by system 100 in memory or other storage location. Wireless system 100 may also include a display 124, such as a liquid crystal display for example, to display information (text, images, etc.). A variety of other peripherals 126 may be coupled to baseband processor 112, such as a memory stick, an audio player, a Bluetooth wireless transceiver, a USB (Universal Serial Bus) port, or other peripheral. These are merely a few examples of the types of devices or peripherals that may be provided as part of wireless system 100 or coupled to baseband processor 112, and the disclosure is not limited thereto.

Wireless system 100 may be used in a variety of systems or applications, such as a mobile or cellular phone, a wireless local area network (WLAN) phone, a wireless personal digital assistant (PDA), a mobile communications device, or other wireless device. In an example embodiment, wireless system 100 may be capable of operating in a variety of transmit/receive frequencies or frequency bands and for a variety of different standards or communications protocols. Although not required, wireless system 100 may be a multi-band wireless system capable of transmitting or receiving signals on one of a plurality of frequencies or bands. For example, wireless system 100 may operate at or around 1900 MHz for WCDMA (Wide-Band Code Division Multiple Access) or PCS (Personal Communications Services), at or around 1800 MHz for DCS (Distributed Communication Services) (these frequencies may be considered an upper band or high band of frequencies), at 850 MHz for GSM (Global System for Mobile communication), at or around 900 MHz for EGSM (Extended GSM) (these frequencies may be considered a lower band or low band of frequencies). These are merely some example frequencies, and the system 100 may operate at many other frequencies and standards.

The term RF (also known as radio frequency) may refer to any transmitted wireless signal frequency range, and is not limited to a specific frequency band or range. Rather, RF signals may be signals received at the 1.9 GHz range, 1.8 GHz range, 850 MHz range, 900 MHz range, other wireless transmission frequency ranges, etc. The term IF (or intermediate frequency) may refer to a frequency range, which may be variable, and that is typically lower than RF. Circuits within a wireless receiver typically down-convert or translate received signals from an RF frequency to an IF frequency to perform some types of processing in some cases. In some cases, an IF frequency range may include frequencies relatively close to zero Hz (as compared to RF), such as 1 KHz, 20 KHz, 100 KHz, 200 KHz, 500 KHz, 900 KHz, etc., or other appropriate IF frequency.

Figure 2:
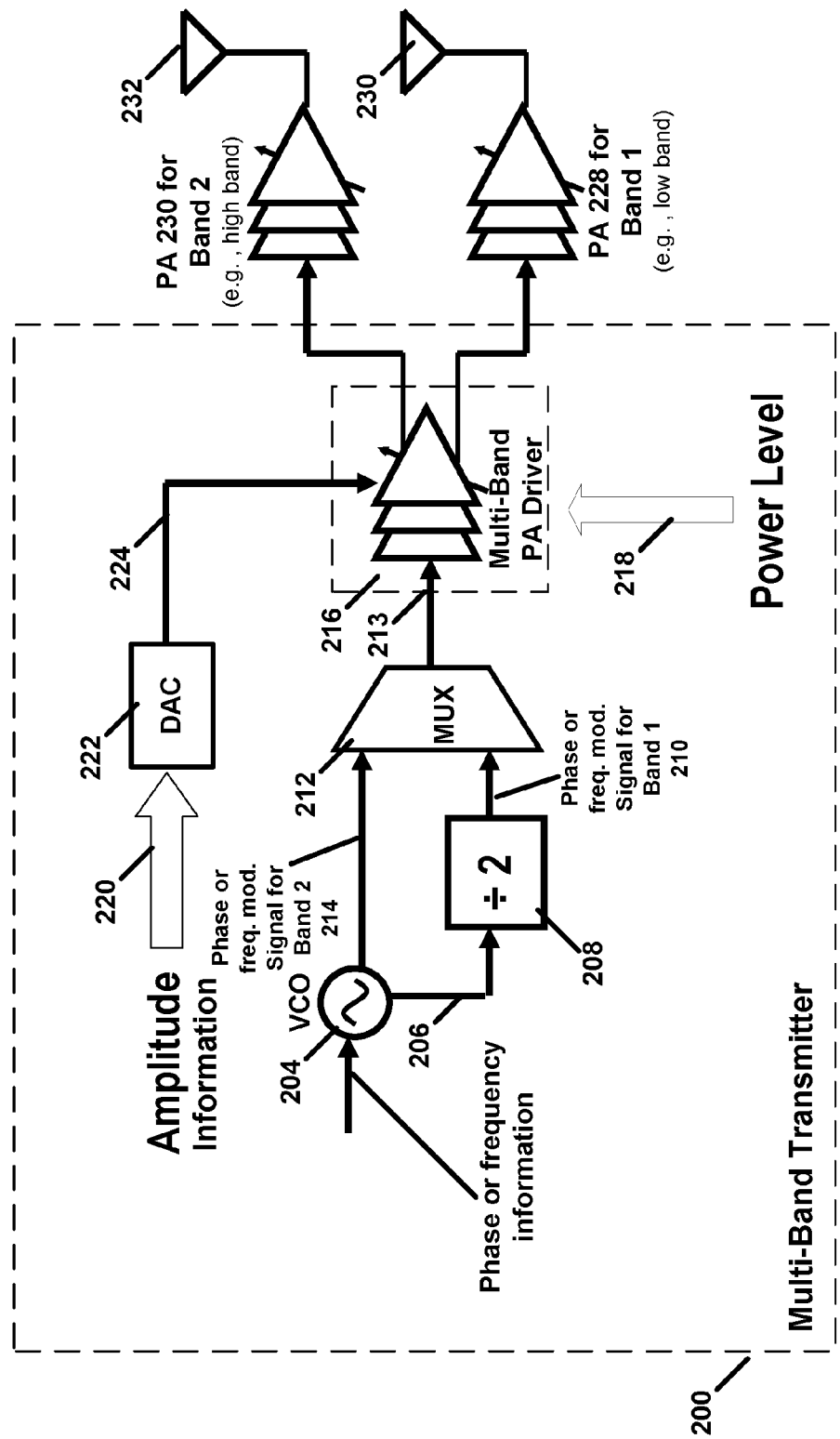
FIG. 2 is a block diagram of a multi-band wireless transmitter according to an example embodiment.

FIG. 2 is a block diagram of a multi-band wireless transmitter 200 according to an example embodiment. Multi-band transmitter 200 may be included within wireless transceiver 102, for example. Wireless transceiver 102 may also include a wireless receiver, not shown. According to an example embodiment, multi-band transmitter 200 may include a number of blocks or circuits, some of which are shown in FIG. 2.

In an example embodiment, multi-band transmitter 200 may include a multi-band power amplifier (PA) driver 216. Multi-band PA driver 216 may, for example, output signals to or drive multiple power amplifiers (PAs), such as to PAs 228 and 230. While only two power amplifiers (PAs) are shown in FIG. 2, PA driver 216 may output signals to or drive any number of PAs. Power amplifiers are also shown generally as power amplifier(s) 140 in FIG. 1.

In an example embodiment, power amplifier (PA) 228 may be coupled to a first output of PA driver 216 to receive and amplify signals associated with a first frequency band or band 1, such as a low band (e.g., 850 and 900 MHz), for example. Similarly, a PA 230 may be coupled to a second output of PA driver 216 to receive and amplify signals for (or associated with) a second frequency band or band 2, such as a high band (e.g., 1850 and 1900 MHz). An antenna 230 is coupled to an output of PA 228, and an antenna 232 is coupled to an output of PA 230. According to an example embodiment, by using one multi-band PA driver to drive multiple power amplifiers (e.g., fewer PA drivers than PAs), a wireless transmitter may, in some cases, be provided that may have a lower cost and/or require less circuitry or silicon space.

Although not required, according to an example embodiment, PA driver 216 may receive a differential input (e.g., positive and negative signals), and may output a signal as a single-ended output to either PA 228 (e.g., when operating in band 1 or low band), and/or to PA 230 (e.g., when operating in band 2 or high band). Therefore, according to an example embodiment and as described in greater detail below, multi-band PA driver 216, in an example embodiment, may provide a conversion from a differential input signal to a single-ended output.

A number of other blocks for multi-band transmitter 200 in FIG. 2 will now be briefly described. A voltage controlled oscillator (VCO) 204 controlled by a phase-locked-loop (PLL) may generate a phase or frequency modulated signal as a VCO output onto lines 214 and 206. Multi-band transmitter 200, may, for example, transmit on one of a plurality of frequency bands, such as either on band 1 (e.g., low band) or band 2 (e.g., high band)), depending on which band the wireless transmitter is operating.

VCO 204 may output a phase and/or frequency modulated signal onto lines 214 and 206. To obtain the lower RF frequency for low band or band 1, the modulated signal output by VCO 204 may, for example, be frequency divided by frequency divider 208 to provide the phase or frequency modulated signal for band 1 (e.g., low band) onto line 210. Multiplexer (or mux) 212 may select one of its inputs for output onto line 213. For example, mux 210 may select the modulated signal received via line 214 when operating for band 2 (e.g., when operating in high band), and may select the signal received via line 210 for band 1 (e.g., when operating in low band), for example.

According to an example embodiment, multi-band PA driver 216 may adjust or vary the power of an output signal based upon a power control signal received via line 218. The power control signal received via line 218 may, for example, be a digital control signal that may control the opening or closing of one or more power control switches or switchable resistors that may adjust or vary the output power of the output signal, for example. Other techniques may be used to adjust the power level of the output signal from PA driver 216.

In an example embodiment, in GSM mode or other types of operating modes, multi-band transmitter 200 may transmit a phase or frequency modulated signal, such as a GMSK modulated signal. In such a GSM mode, the amplitude of the output signal may be constant or substantially constant. However, in other modes of operation, such as EDGE, which may use 8PSK modulation for example, the output signal may be both phase and amplitude modulated. Therefore, amplitude information may be received via line 220 and converted from digital to analog by digital-to-analog converter (DAC) 222 to output an analog amplitude signal onto line 224. In EDGE mode or other mode that may use amplitude modulation, multi-band PA driver 216 may receive a phase (or frequency) modulated signal via line 213. PA driver 216 may amplitude modulate the phase modulated signal received via line 213 based on the amplitude signal received via line 224 to output a phase and amplitude modulated signal, for example. In an example embodiment, although not required, the phase or frequency modulated signal received via line 213 may be received at PA driver 216 as a differential signal, while the outputs from PA driver 216 may each be provided as single-ended outputs to PA 228 and PA 230.

Figure 3:
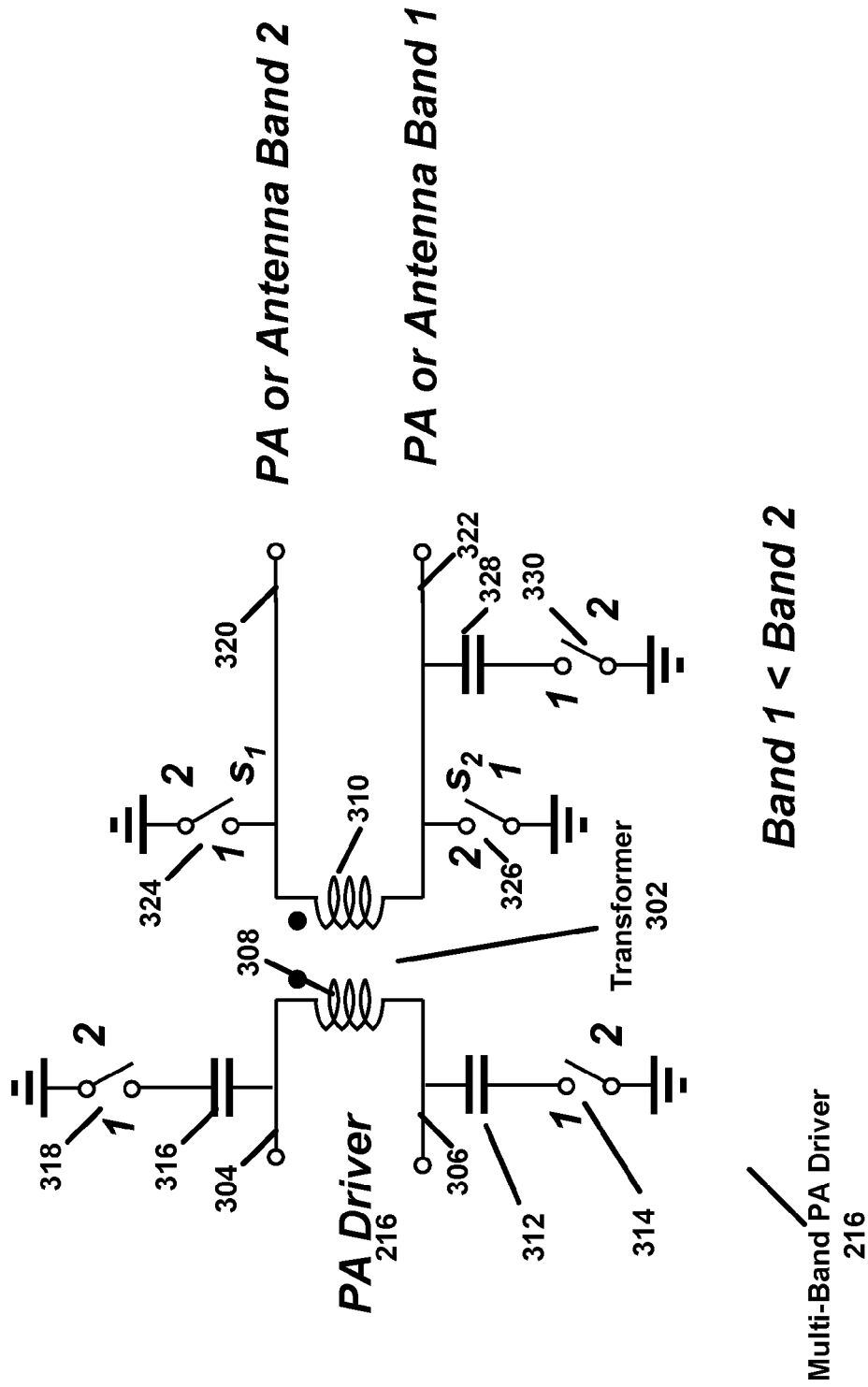
FIG. 3 is a diagram illustrating a multi-band PA driver according to an example embodiment.

FIG. 3 is a diagram illustrating a multi-band PA driver according to an example embodiment. As shown in FIG. 3, PA driver 216 may include a transformer 302 that may include a primary transformer winding 308 and a secondary transformer winding 310. According to an example embodiment, differential input signals may be received at inputs 304 and 306 of transformer 302. Transformer 302 may include a plurality of single-ended outputs, e.g., a single-ended output for each band, or to drive each PA. For example, output 320 may be coupled to PA 230, e.g., for band 2, while output 322 may be coupled to PA 228, e.g., for band 1. Therefore, according to an example embodiment, transformer 302 may substantially output a signal associated with a first frequency band or band 1 onto output 322, and may substantially output a signal associated with a second frequency band or band 2 onto output 320, for example. However, a portion of the voltage or power from transformer 302 may be applied to an unselected output of transformer 302, even though such unselected output may not be transmitting signals.

A switch 324 is coupled to output 320 and may be closed to couple the output 320 to ground, with switch 326 open, and thereby substantially allow the signal received on the differential inputs 304 and 306 to be output on single-ended output 322 to drive PA 228 for band 1, e.g., as measured to ground. However, in some cases, a portion of the voltage or power output from the transformer 302 may be provided on the other (unselected) output 320 even though the PA (PA 230) for such unselected output may not be transmitting in such case.

Likewise, a switch 326 is coupled to output 322 and may be closed to couple the output 322 to ground, with switch 324 open, and thereby substantially allow the signal received on the differential inputs 304 and 306 to be output on single-ended output 320 to drive PA 230 for band 2 (although a portion of the power may be provided on the unselected output 322, even though PA 228 for band 1 may not be transmitting in such case).

Therefore, according to an example embodiment, when multi-band transmitter 200 is operating in band 1 or transmitting in low band, switch 324 may be closed and switch 326 may be open and the received input signal on band 1 may then be substantially output onto output 322 to drive PA 228 for band 1. Likewise, according to an example embodiment, when multi-band transmitter 200 is operating in band 2 or transmitting in high band, switch 326 may be closed and switch 324 may be open and the received input signal on band 2 may then be substantially output onto output 320 to drive PA 230 for band 2. Thus, a switch coupled to the output to drive the associated PA may be open, with the other switch(es) closed, for example. This may, for example, allow a substantial portion of the voltage or power output from transformer 302 to be applied, in some cases, to the selected output to drive the associated PA for transmission.

The use of switches 324 and 326 may allow, for example, one transformer 302 (and PA driver 216) to accommodate multiple frequency bands, and output a received signal onto one of a plurality of outputs to drive a PA associated with the particular band that is being used. Thereafter, when multi-band-transmitter 216 switches from band 1 to band 2, for example, the configuration of switches 324 and 326 may be changed to accommodate the change in frequency band, e.g., by closing switch 326 and opening switch 324, to now substantially output the received signal onto output 320 to drive PA 230 for band 2, as an example. Thus, rather than using a separate PA driver for each band or PA, according to an example embodiment, one multi-band PA driver 216 may be used to drive a plurality of PAs (e.g., PA 228 and 230), where each PA may be provided for one or more frequency bands.

In addition, according to an example embodiment, although not required, transformer 302 may be tuned to operate in either band 1 or band 2. By tuning transformer 302 to operate in a specific frequency band (e.g., either band 1 or band 2), performance of transformer 302 may be improved, for example. A resonance frequency of a circuit, such as transformer 302, may be inversely proportional to capacitance. Thus, adding capacitance to the circuit may decrease the resonance frequency of a circuit, for example, and allow better performance at a lower frequency in some cases.

Therefore, one or more switchable capacitors may be switched in to add capacitance when transformer 302 is operating at band 1 or low band. For example, switches 318, 314 and 330 may be closed to add capacitance when transformer 302 is operating in band 1. For example, switch 318 is coupled between input 304 and capacitor 316. Switch 318 may be closed when transformer 302 is operating in band 1, and may be open when operating in band 2. Switch 314 may be coupled between capacitor 312 and ground at input 306. Switch 314 may be closed to couple capacitor 312 to ground at input 306 when operating in band 1 (e.g., low band), and may be opened when operating in band 2, for example. Switch 330, coupled between ground and capacitor 328 at output 322. Switch 330 may be closed when transformer 302 is operating in band 1, and may be open when operating in band 2. One or more of these capacitors (or other capacitors) may be switched in to provide additional capacitance and tune transformer 302 to operate at a specific frequency band, for example. N-channel metal oxide semiconductor (NMOS) transistors, for example, may be used for switches 318, 314 and 330, in an example embodiment, although other types of transistors or circuits may be used as well.

In the examples described above multi-band PA driver 216 and transformer 302 are shown as operable for only two frequency bands, e.g., band 1 and band 2. Thus, in the example embodiment shown in FIGS. 2 and 3, PA driver 216 may be referred to as a dual-band PA driver, and transformer 302 may be referred to as a dual-band transformer, in this example, since PA driver 216 and transformer 302 drives two PAs (PA 228 and PA230). However, PA driver 216 and transformer 302 may be operable for and drive any number of frequency bands or PAs. For example, transformer 302 may be a three-tap transformer to drive three PAs, for example. Thus, by adding more taps to transformer 302, any number of PA drivers may be accommodated.

The term multi-band PA driver or multi-band transformer may refer to a PA driver or transformer having the ability to drive multiple (or a plurality of) bands or PAs, e.g., two bands (dual-band embodiment), three bands, or more, for example. Therefore, the term multi-band includes a dual-band embodiment where two bands or two PA drivers are driven by the PA driver 216 or transformer 302. Although the various example embodiments shown in the FIGs. and described herein include only two bands or two PA drivers, transformer 302 may driver any number of bands or PA drivers, e.g., by providing additional taps, as noted.

With respect to tuning the transformer 302 if, for example, multi-band PA driver 216 is operated at three different frequency bands, e.g., driving three different PAs, then no additional capacitors may be used for a high frequency band, two (for example) additional capacitors may be switched in when operating in the medium frequency band, and three additional capacitors may be switched in when operating the transformer at a low band. This may allow the transformer to be tuned to a particular frequency or band of operation, for example. This is merely another example, and many other variations or embodiments may be used. As noted, to drive three bands or three PAs, a three-tap transformer 302 may be used.

Figure 4:
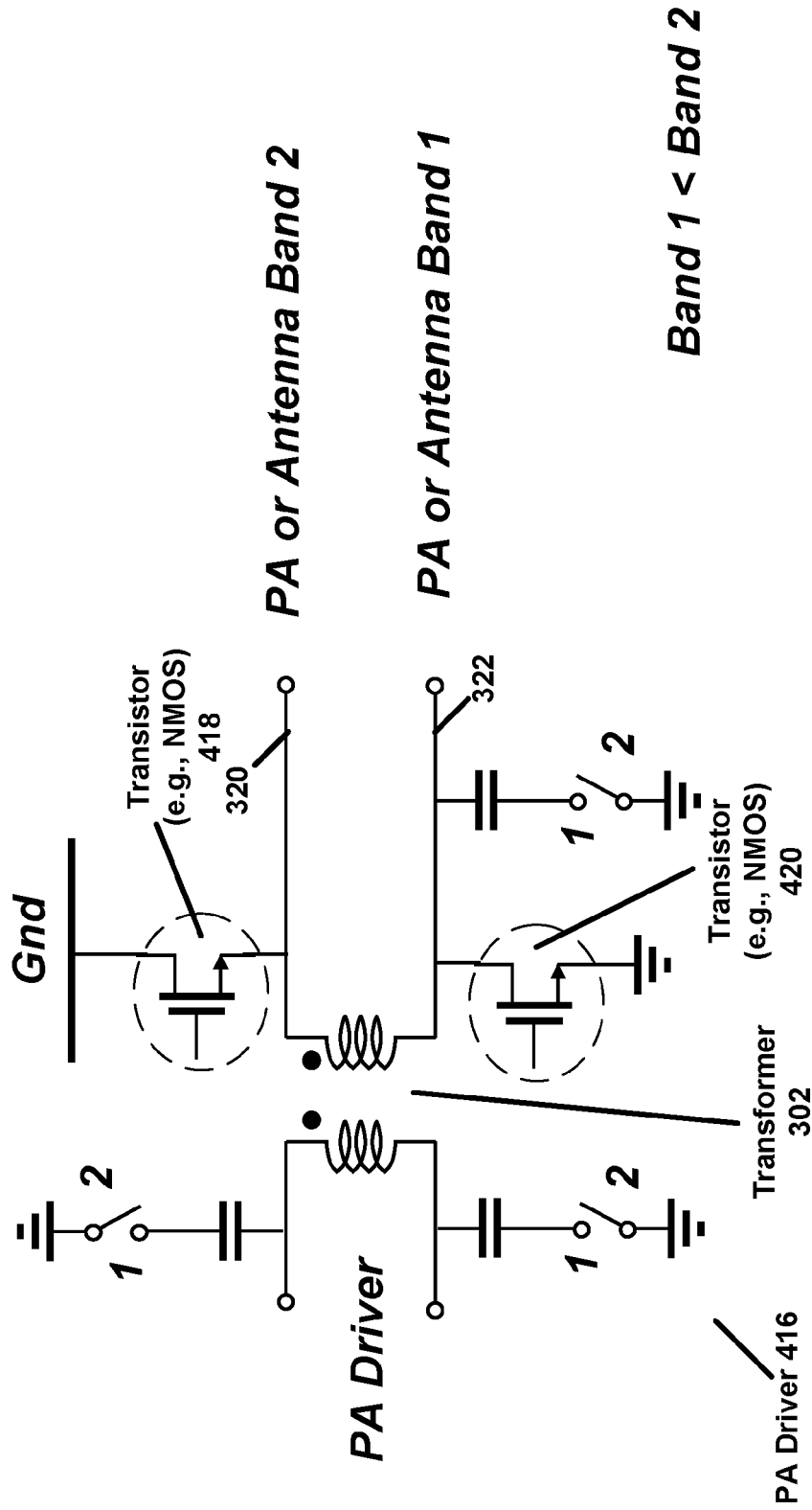
FIG. 4 is a diagram illustrating a multi-band PA driver according to another example embodiment.

FIG. 4 is a diagram illustrating a multi-band PA driver 416 according to another example embodiment. Multi-band PA driver 416 is shown in FIG. 4, and may be generally the same as the PA driver 216 shown in FIG. 3. However, in FIG. 4, switch 324 (from FIG. 3) is implemented as a transistor 418, while switch 326 (from FIG. 3) may be implemented as a transistor 420. In an example embodiment, transistors 418 and 420 may be a same type of transistor, e.g., both transistors may be NMOS transistors, or both transistors may be PMOS (P-channel MOS) transistors, as examples.

Briefly, in operation, if signal associated with band 1 (e.g., low band) is received (e.g., transformer 302 operating at band 1 or low band), signals may be applied to the gates of transistors 418 and 420 so as to turn on transistor 418 and turn off transistor 420. This may allow the modulated input signal received at inputs to transformer 302 to be output, e.g., as a single-ended output, onto output 322 to drive PA 228 for band 1, for example. The output signal provided on output 322 is biased to ground. In some cases, when a negative portion of the output signal on output 322 drops below or exceeds about −0.7V (the diode junction voltage), transistor 420 may typically clip the output signal on output 322, causing the output signal to be distorted.

Similarly, when operating in band 2, e.g., high band, signals may be applied to the gates of transistors 418 and 420 so as to turn on transistor 420 and turn off transistor 418. This may allow the modulated input signal received at inputs to transformer 302 to be output, e.g., as a single-ended output, onto output 320 to drive PA 230 for band 2, for example. A similar clipping of the output signal on output 320 may occur for band 2 or high band.

Figure 5:
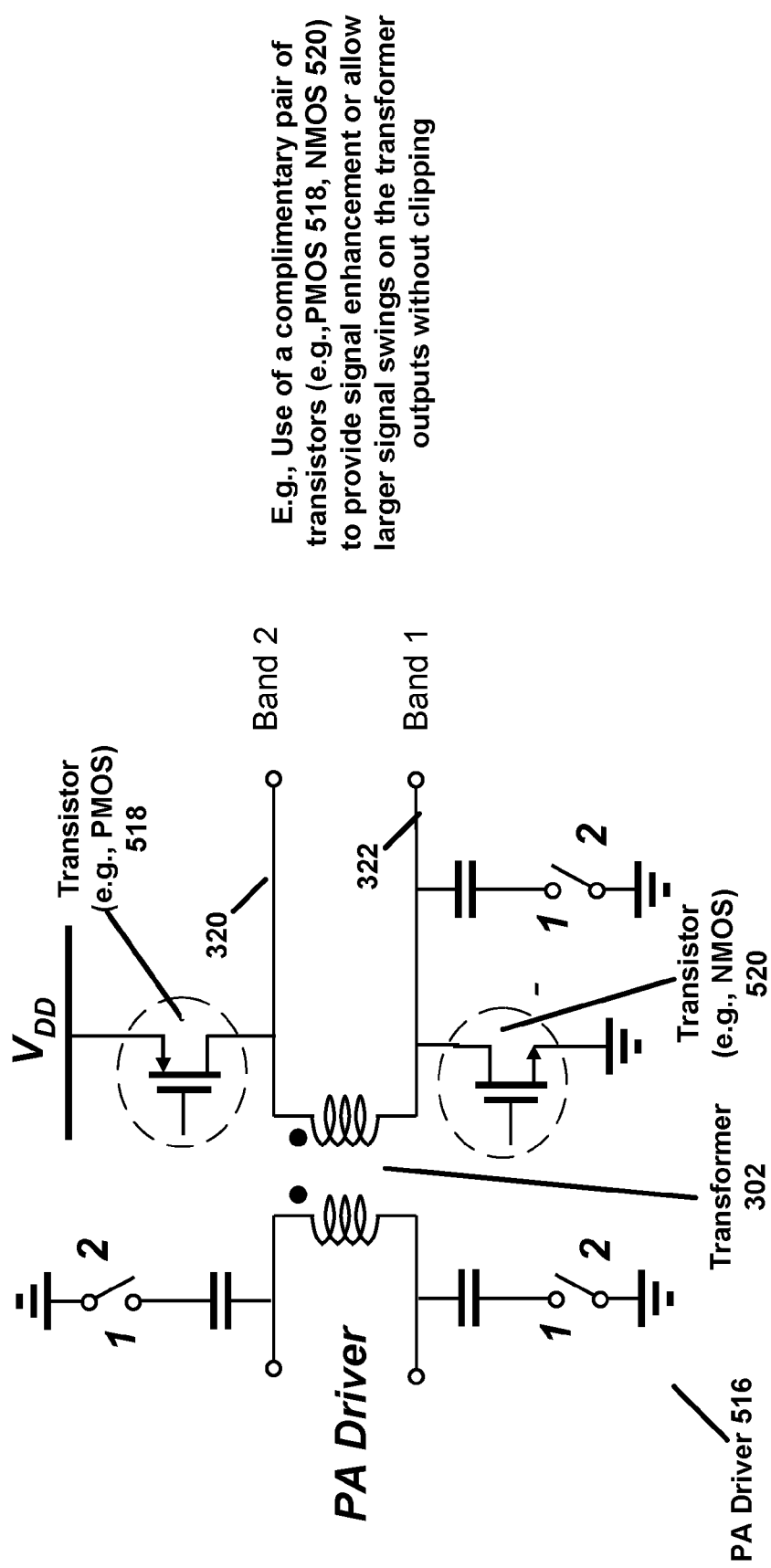
FIG. 5 is a diagram illustrating a multi-band PA driver according to yet another example embodiment where a complimentary set of transistors may be used for switches for outputs.

FIG. 5 is a diagram illustrating a multi-band PA driver 516 according to yet another example embodiment where a complimentary set of transistors may be used for switches for outputs. The PA driver 516 is very similar to the PA driver 416 of FIG. 4. However, PA driver 516 may use a complimentary set of transistors 518 and 520 to provide signal enhancement. For example, a PMOS transistor 518 may be coupled between output 320 and VDD, where VDD may be a power supply voltage, typically between 1.5V and 3.0V, for example. Transistor 520 may be an NMOS transistor coupled between ground and output 322, for example. In an example embodiment, when operating in band 1, e.g., low band, transistor 518 may be turned on, and transistor 520 may be turned off to allow the received signal to be substantially output onto output 322 for band 1. Similarly, when operating in band 2, e.g., high band, transistor 520 is turned on, and transistor 518 is turned off to allow the received signal to be substantially output onto output 320 for band 2.

However, in the case of using a complimentary set of transistors (e.g., PMOS 518, NMOS 520) for switches to control signal output onto single-ended outputs for different bands for transformer 302, a signal enhancement of approximately VDD may be achieved on the outputs 320 and 322 (e.g., as compared to use of two transistors of the same type in FIG. 4). For example, in the case of operating at band 1 or low band, because PMOS transistor 518 is coupled to VDD (instead of ground), the output signal provided on output 322 may be biased at VDD (not ground as in the case for FIG. 4). Thus, for the circuit of FIG. 5, the signal output onto output 322 will typically not be clipped until the output signal, on the negative side, exceeds −(VDD+diode junction voltage). Thus, the output signal on output 322 will typically not be clipped until the negative portion of the output signal exceeds about −2.1V, in the example where VDD is about 1.5V, and the example diode junction voltage is about 0.6V. Greater signal enhancement may be achieved by increasing VDD (e.g, from 1.5V to 2.5V), for example.

Thus, the use of a complimentary set of transistors (e.g., including a first transistor coupled to VDD, and a second transistor coupled to ground) for switches to control signal outputs on the transformer 302 may provide signal enhancement of approximately VDD on the transformer outputs. In other words, the use of complimentary transistors for switches as shown in FIG. 5 may allow for larger signal swings by an amount, VDD, before clipping of the output signal may typically occur. A similar type of signal enhancement of VDD may be achieved for operation in band 2 or high band, when using the complimentary set of transistors 518, 520 (e.g., as compared to using two transistors of a same type, as shown in FIG. 4). In an example embodiment, an AC-coupling capacitor (not shown) may be used at (or coupled to) one or both of the outputs to eliminate or at least decrease DC bias at VDD.

Figure 6:
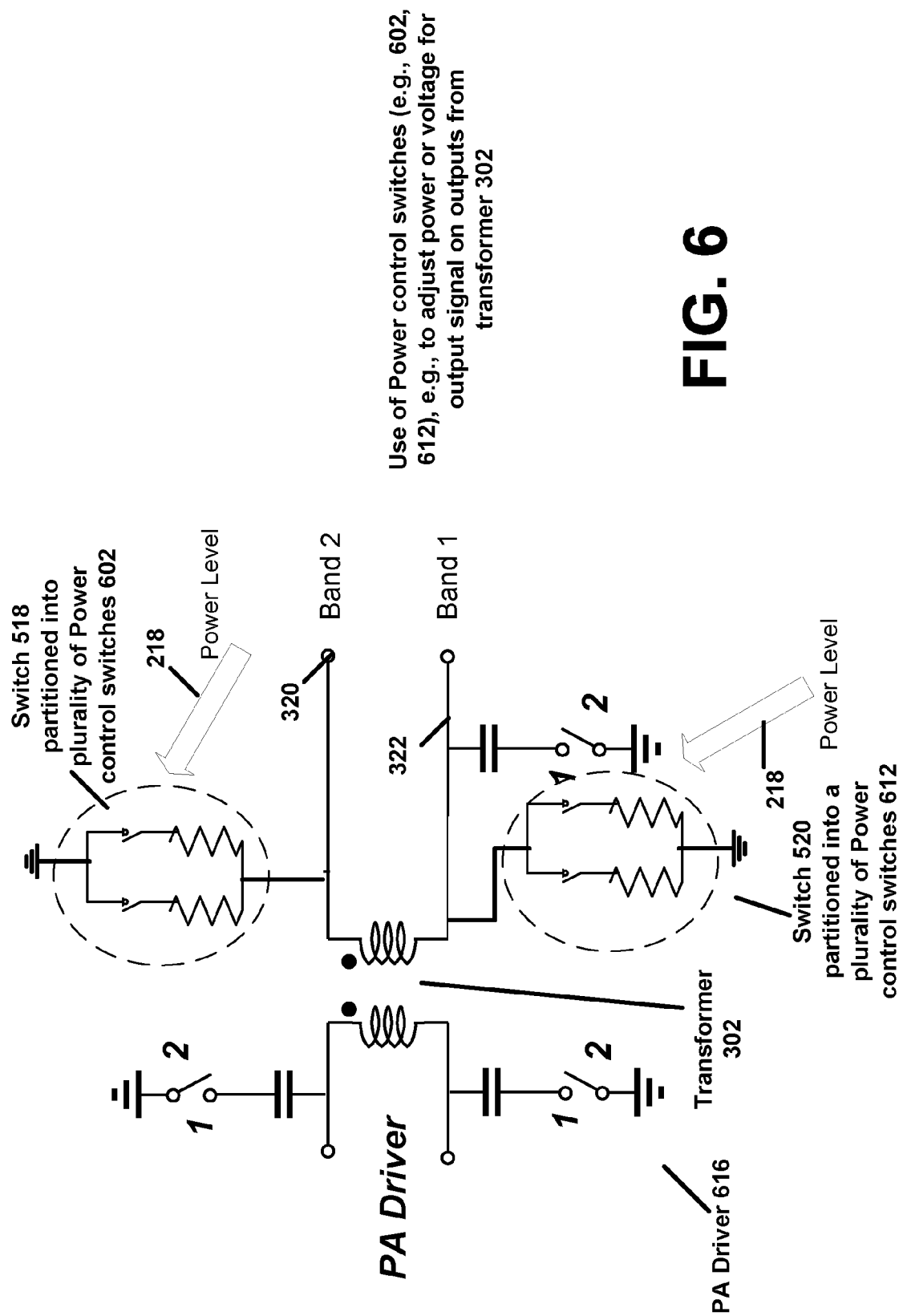
FIG. 6 is a diagram illustrating a multi-band PA driver according to yet another example embodiment where power control may be applied to the outputs.

FIG. 6 is a diagram illustrating a multi-band PA driver 616 according to yet another example embodiment where power control may be applied to the outputs. According to an example embodiment, each of switches 518 and 520 may be partitioned or divided into a plurality of switches or transistors to provide power control by opening or closing one or more of the switches. These transistors or switches may be referred to as power control switches. For example, switch 518 may be partitioned into a plurality of switches 602, while switch 520 may be partitioned into a plurality of switches 612. Switches 602 and/or 612 may be used to adjust or control the output power. Each switch or transistor 602, 612, may inherently include some resistance, and this resistance is shown in FIG. 6 as s resistor coupled to each power control switch. Although, when implemented as transistors, a separate resistor may not be included, for example.

In an example embodiment, the power control switches 602 and/or 612 may be used to selectively vary the power (or voltage) of a signal output onto transformer outputs 320 and/or 322. The power or voltage of signals on outputs 320 and 322 may be varied, for example, based on a received power control signal via line 812. The power control signal 812 may include one or more digital signals that may control each of the switches of power control switches 602 and/or 612 to control the power of signals on outputs 320 and 322.

Referring to FIG. 6, in an example embodiment, if all of the power control switches 602 and 612 are open, the voltage (or power) across the secondary winding 310 (FIG. 3) may be divided approximately equal across outputs 320 and 322. In one embodiment, switches 602 and 612 may be considered power control switches. In another illustrative embodiment, if all the power control switches (e.g., 612) coupled to output 322, for example, are on, then output 322 may be substantially pulled to ground, and substantially all of the voltage across the secondary winding 310 of transformer 302 may then typically be provided or output to output 320. In this example, the power control switches (602) may be left open (or turned off). In this manner, by opening all (or substantially all) power control switches coupled to a selected output (e.g., output 320) and closing all (or substantially all) power control switches (turning on all power control transistors) coupled to an unselected output (e.g., output 322), substantially all of the voltage or power received across the secondary winding 310 may be transferred or output onto the selected output of the transformer 302.

The power or voltage applied to the selected output (e.g., output 322) may thereafter be decreased by opening one or more switches coupled to the unselected output, which may increase the voltage on the unselected output, thereby decreasing the voltage on the selected output. This is because the voltage (or power) output from secondary winding 310 may be divided or allocated across the two outputs 320, 322, and opening a switch coupled to the unselected output may increase the voltage to the unselected output, thereby decreasing the voltage or power to the selected output. Similarly, voltage or power to the selected output (e.g., output 322) may be further decreased by closing one or more power control switches coupled to the selected output. Closing switches coupled to the selected output may decrease the power or voltage on the selected output, according to an example embodiment. Opposite operations may be performed in order to increase power to a selected output, e.g., power or voltage applied to a selected output may be increased by opening one or more power control switches coupled to a selected output and/or by closing one or more power control switches coupled to an unselected output.

Figure 7:
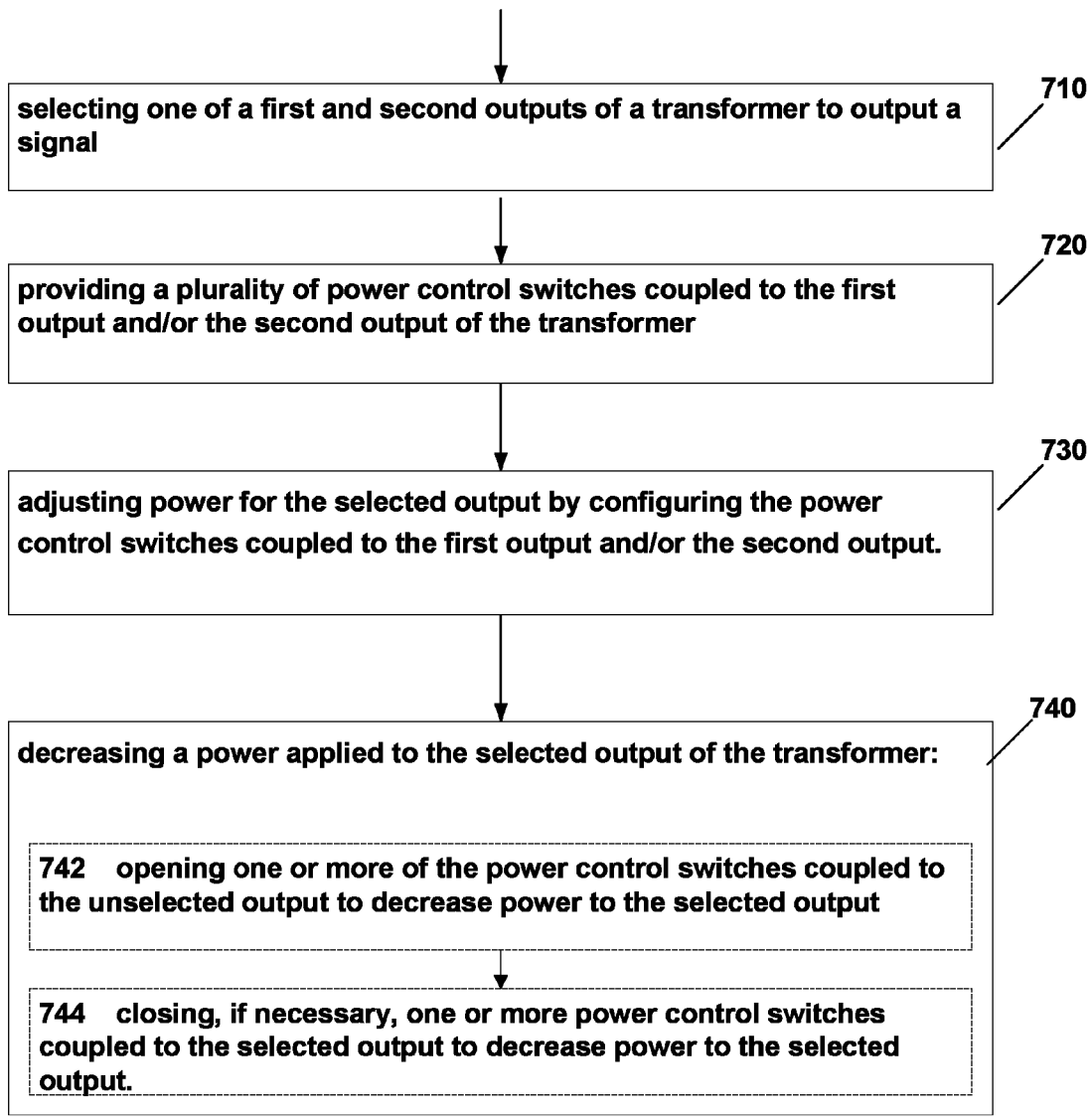
FIG. 7 is a flow chart illustrating operation of power control being performed for a transformer according to an example embodiment.

FIG. 7 is a flow chart illustrating operation of power control being performed for a transformer according to an example embodiment. At 710, one of a first and second outputs of a transformer may be selected to output a signal. For example, output 322 of transformer 302 may be selected to output a signal associated with band 1, e.g., to drive PA 228. This selection may be based upon the band or frequency in which the multi-band transmitter 200 is operating, e.g., operating in band 1 or low band.

At 720, a plurality of power control switches may be coupled, e.g., in parallel, to the first output and/or second output. For example, power control switches 602 may be coupled to output 320, while power control switches 612 may be coupled to output 322. Power control switches may be provided as NMOS or PMOS transistors, for example.

At 730, power for the selected output may be adjusted by configuring the power control switches coupled to the first output and/or the second output. For example, one or more switches of power control switches 602 and/or of power control switches 612 may be configured (e.g., opened or closed) to adjust power or voltage applied to the selected output.

At 740, power applied to the selected output may be decreased by: opening one or more of the power control switches coupled to the unselected output (742), and then closing, if necessary, one or more power control switches coupled to the selected output (744).

In some of the embodiments described above, a transmitter is disclosed that includes a multi-band PA driver (and transformer) that can drive multiple frequency bands or multiple PAs, e.g., one PA driver to drive both high band signals to a first PA and low band signals to a second PA, for example.

According to another example embodiment, a transmitter may operate in different operating modes, such as a first operating mode that may transmit signals for a WCDMA (Wide-Band Code Division Multiple Access) and/or HSUPA (High-Speed Uplink Packet Access), and a second operating mode that may transmit signals for GSM (Global System for Mobile communication) and/or EDGE (Enhanced Data Rates for GSM Evolution). These are just some example operating modes, and others may be used as well.

According to an example embodiment, two different transmitters (or PA drivers and transformers) may be provided or made available, including a first transmitter that may transmit or output signals for different operating modes to separate power amplifiers, e.g., output a GSM/EDGE signal to a first PA, and output a WCDMA and/or HSUPA signal to a second PA. A separate transmitter or PA driver may be provided that may output a common or multi-mode output, e.g., output signals for GSM/EDGE/WCDMA (and/or HSUPA) via one output to one PA. Thus, in this embodiment, two different transmitters (or transceivers) may be provided, and the circuit designer may select one of these transmitter or transceivers depending on whether separate PAs are used for different operating modes, or whether one combined PA is used for multiple modes.

However, according to an example embodiment, a configurable transmitter (or configurable wireless transceiver) may be provided that is configurable to operate in either: 1) a separate PA configuration where the transmitter (including a transformer) is configured to work with separate PAs, and to output either a signal associated with a first operating mode (e.g., GSM/EDGE mode) via a first output to a first PA, or to output a signal associated with a second operating mode (e.g., WCDMA and/or HSUPA) to a second PA; or 2) a combined PA configuration where the transmitter (including the transformer) is configured to output signals for multiple modes, e.g., signals associated with the first operating mode (e.g., GSM/EDGE) and signals associated with the second operating mode (e.g., WCDMA) via a first output to a common (or one or combined) PA. Thus, transmitter (or transmitter portion of a wireless transceiver) may be configured to operate with separate PAs (e.g., different or separate PAs for different operating modes) in a separate PA configuration, and may be configured to operate with a common or combined PA in a combined PA configuration. In such case, only one transmitter (or wireless transceiver) may be provided, regardless if the transmitter will be used with one (multimode) PA or separate PAs. Further example details will now be described.

Figure 8:
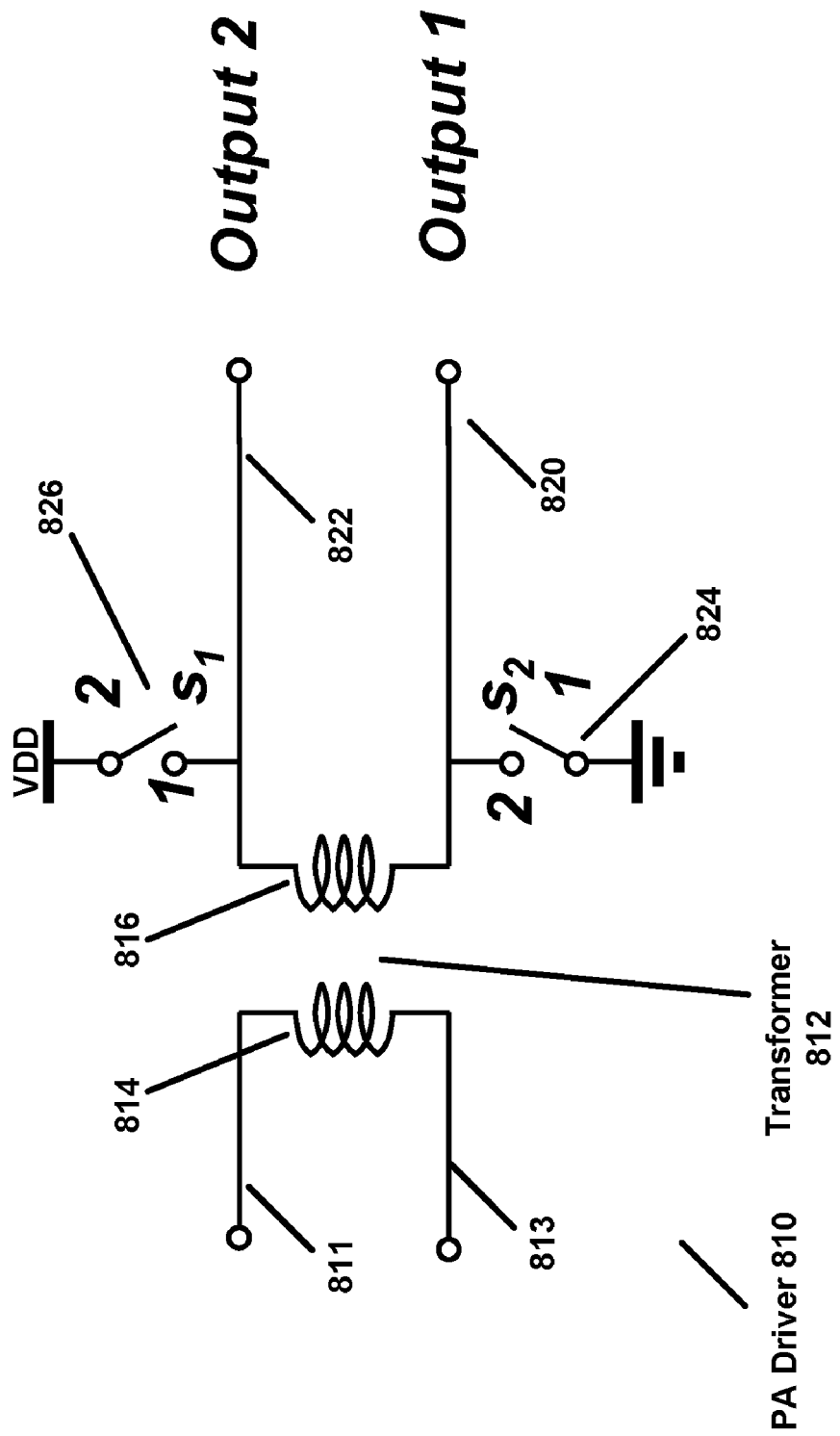
FIG. 8 is a diagram illustrating a power amplifier (PA) driver or transformer according to an example embodiment.

FIG. 8 is a diagram illustrating a PA driver according to an example embodiment. PA driver 810 may be provided within a wireless transmitter or transceiver. As shown in FIG. 8, PA driver 810 may include a transformer 812 that may include a primary transformer winding 814 and a secondary transformer winding 816. According to an example embodiment, differential input signals may be received at inputs 811 and 813 of transformer 812. Transformer 812 may include a plurality of single-ended outputs, including output 1 (or output 820) and output 2 (or output 822).

A switch 824 (S1) is coupled to output 820 (output 1) and may be closed to couple the output 820 to ground, with switch 826 (S2) open, and thereby substantially allow the signal received on the differential inputs 811 and 813 to be output on single-ended output 822. Likewise, a switch 826 (S1) is coupled to output 822 (output 2) and may be closed to couple the output 822 to ground, with switch 824 open, and thereby substantially allow the signal received on the differential inputs 811 and 813 to be output on single-ended output 820.

Switches 824 and 826 may, for example, be controlled by a processor (such as baseband processor 112) or controller, e.g., via execution of software or firmware. Thus, software or firmware may be written or provided, stored in memory, and executed by a processor to configure the switches 824 and/or 826 in PA driver 810 so that the PA driver or transmitter is configured to operate in either separate PA (power amplifier) configuration or a combined PA (power amplifier) configuration.

In a separate PA configuration, output 820 (output 1) may be connected to a first PA, e.g., a PA for transmitting GSM or EDGE signals (e.g., a GSM/EDGE PA), and output 822 (output 2) may be connected to a second PA, e.g., a WCDMA PA for transmitting WCDMA or HSUPA signals, for example. Thus, in this separate PA configuration, separate PAs may be coupled to each of outputs 820 and 822 of the PA driver 810 (or transformer 812). The processor may then, configure or open or close the switches to transmit signals via one of the PAs, depending on the operating mode for the transmitter. In an example embodiment, the transmitter or wireless transceiver may be a multimode transceiver, capable of transmitting and receiving signals in one of several modes, including GSM, EDGE, WCDMA, HSUPA, etc., or other modes at different times, for example. Thus, while in the separate PA configuration, the transceiver may switch its operation between different operating modes, and the switches may be configured accordingly. For example, a first PA (for transmitting GSM or EDGE signals) may be coupled to output 820 and a second PA (for transmitting WCDMA or HSUPA signals) may be coupled to output 822. In an example embodiment, the processor may open switch 824 and close switch

826 while operating in GSM/EDGE mode to drive the first PA, and may open switch 826 and close switch 824 while operating in WCDMA/HSUPA mode to drive the second PA.

Figure 9:
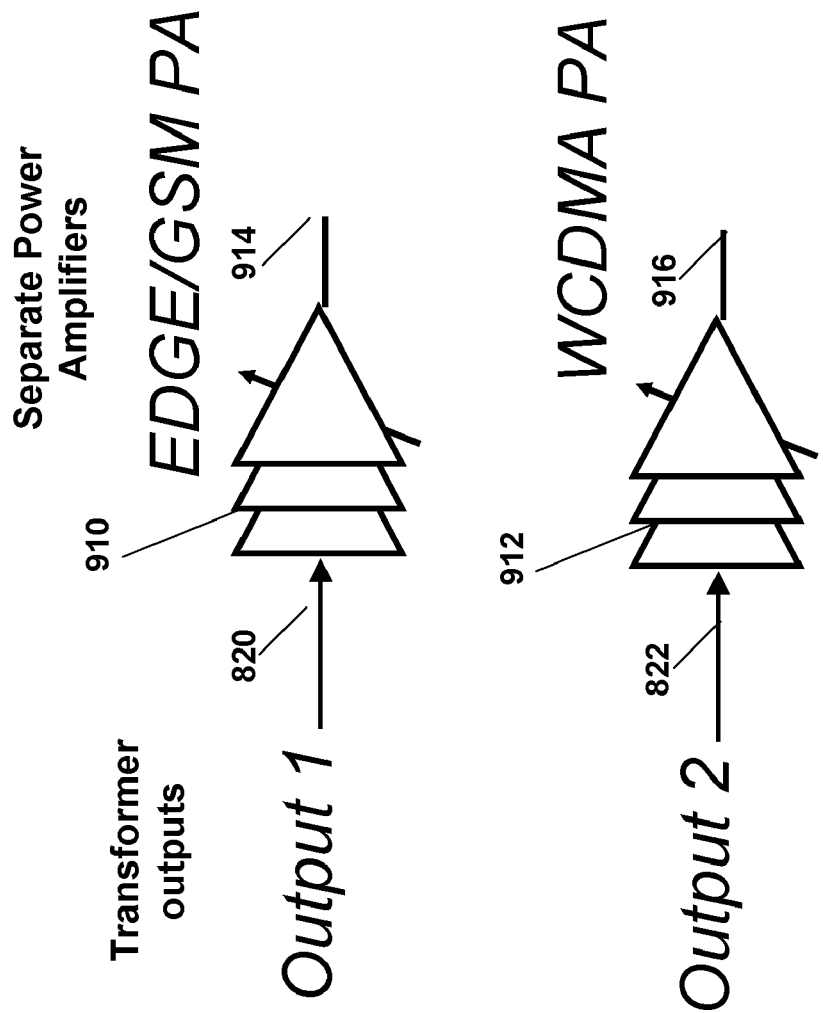
FIG. 9 is a diagram illustrating use of separate PAs while a transmitter or PA driver is configured to operate in a separate PA configuration.

FIG. 9 is a diagram illustrating use of separate PAs while a transmitter or PA driver is configured to operate in a separate PA configuration. As shown in FIG. 9, two PAs are shown including PA 910 (e.g., an EDGE/GSM PA) and PA 912 (e.g., a WCDMA PA). PA 910 may receive a signal from the transmitter or PA driver 810 while the transmitter is operating in EDGE/GSM mode while configured in the separate PA configuration, and may output the amplified EDGE/GSM signal via line 914. Similarly, PA 912 may receive a signal from the transmitter or PA driver 810 while the transmitter is operating in WCDMA mode while configured in the separate PA configuration, and may output the amplified WCMDA (or HSUPA) signal via line 916.

Referring to FIG. 8 again, in an example embodiment of a combined PA configuration, one of the switches may be open, to allow signals to be output to a combined (or multi-mode) PA, while the other switch is closed to pull that output to ground. For example, while the transmitter or PA drier 810 is configured to operate in combined PA configuration, a single PA may coupled to one of the outputs, e.g., to output 1 or output 820 of transmitter or PA driver 810. The combined PA may receive and amplify signals for the different modes of operation, e.g., for GSM, EDGE, WCDMA, HSUPA. The output 2 or output 822 may be connected to ground (via switch 826) and may remain unused in this example for the combined PA configuration.

Figure 10:
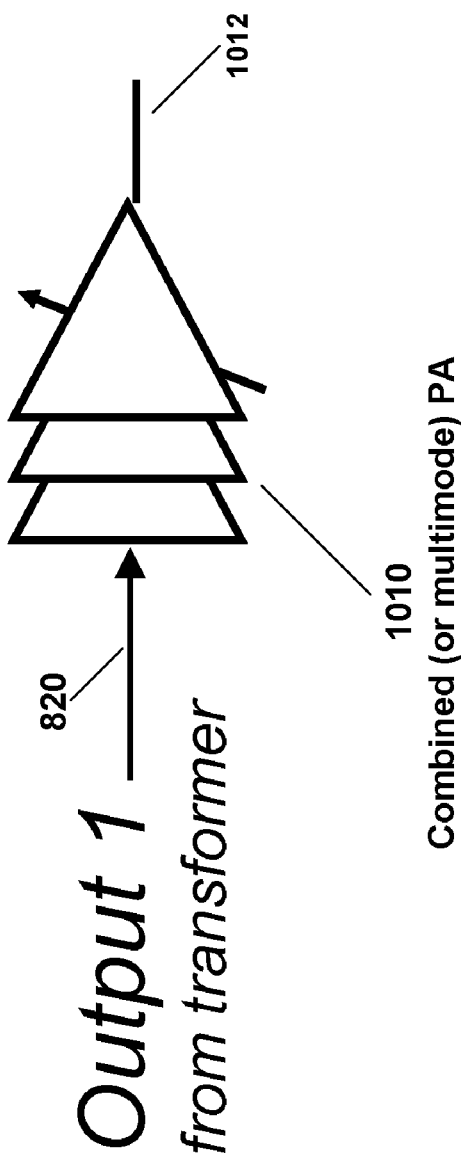
FIG. 10 is a diagram illustrating use of a PA while a transmitter or PA driver is configured to operate in a combined PA configuration.

FIG. 10 is a diagram illustrating use of a PA while a transmitter or PA driver is configured to operate in a combined PA configuration. A PA 1010 (e.g., a combined PA or multi-mode PA) may receive a signal via output 1 or output 820 of transmitter or PA driver 810 (FIG. 8) while the transmitter is configured in the combined PA configuration. In this configuration, signals output by the transmitter or PA driver 810 are all output via one output, e.g., output 820 in this example, with output 822 being unused (e.g., and connected to ground). The received signals are amplified by combined PA 1010 and output via line 1012, for all (or multiple modes of operation), including for GSM, EDGE, WCDMA, HSUPA, etc., as an example.

Figure 11:
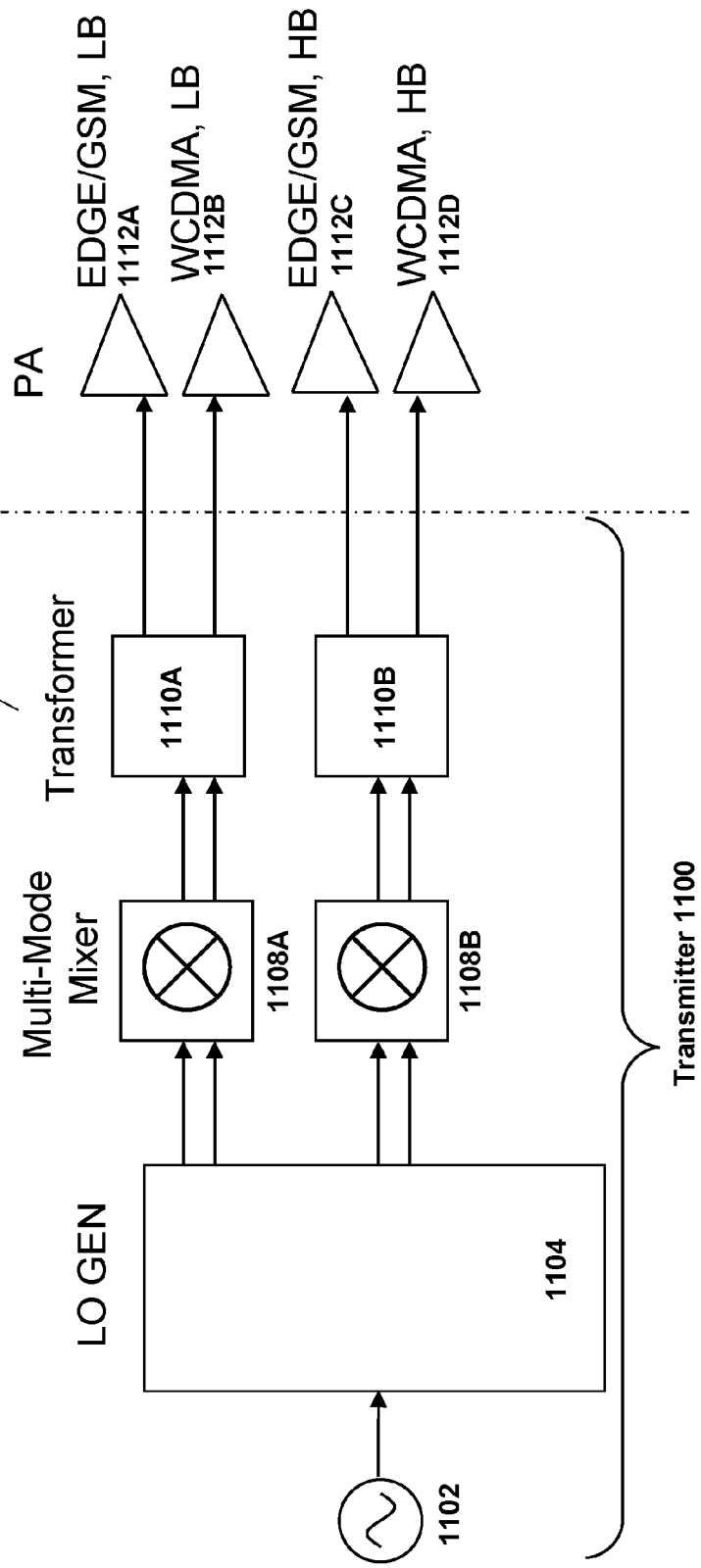
FIG. 11 is a block diagram illustrating a transmitter configured in a separate PA configuration for multiple bands according to an example embodiment.

FIG. 11 is a block diagram illustrating a transmitter configured in a separate PA configuration for multiple bands according to an example embodiment. A transmitter 1100 (or portion thereof) is shown in FIG. 11, and may include, for example, a voltage controlled oscillator (VCO) 1102 may output a signal at an operating frequency (modulated or unmodulated) for a selected channel for a selected band or for each of multiple bands. A local oscillator generator (LO generator) 1104 may generate a LO signal at a selected one of a plurality of frequencies, e.g., based on a selected channel. A signal to be transmitted may be up-converted by a mixer, by mixing the baseband signal with the signal output by the LO generator 1104. Because transmitter 1100 may be capable of operating in different modes, transmitter 1100 may be referred to as a multi-mode transmitter. Also, transmitter 1100 may be capable of operating in different frequency bands, which may be referred to as low band and high band, as examples.

According to an example embodiment, the transmitter 1100 may include a multi-mode mixer 1108 and a transformer 1110 for each of multiple bands, such as for both the low band and the high band. There is a transformer 1110 connected to each multi-mode mixer 1108, including: multi-mode mixer 1108A for low band and a transformer 1110A for low band, and a multi-mode mixer 1108B for high band and a transformer 1110B for high band. Each transformer 1110 may receive a signal on its differential inputs and may output the signal via one of the single-ended outputs (depending on the mode of operation) to an associated PA to amplify the signal for wireless transmission. Transformer 1110A (for low band) has a first output coupled to a PA 1112A for EDGE/GSM, low band (LB), and a second output coupled to a PA 1112B for WCDMA, low band (LB). Similarly, transformer 1110B (for high band) has a first output coupled to a PA 1112C for EDGE/GSM, high band (HB), and a second output coupled to a PA 1112D for WCDMA, high band (HB). Thus, according to an example embodiment, as shown in FIG. 11, a transformer may be provided for each of low band and high band. Both of these transformers (1110A and 1110B) may be configured, in this example, for separate PA configuration, or to operate with separate PAs for different modes of operation. Thus, for each transformer (1110A, 1110B), an EDGE/GSM PA (1112A, 1112C) and a WCDMA PA (1112B, 1112D) are coupled to different outputs of the transformer. Transformers 1110A and 1110B may be the same, or similar to, PA driver 810 or transformer 812, for example.

Figure 12:
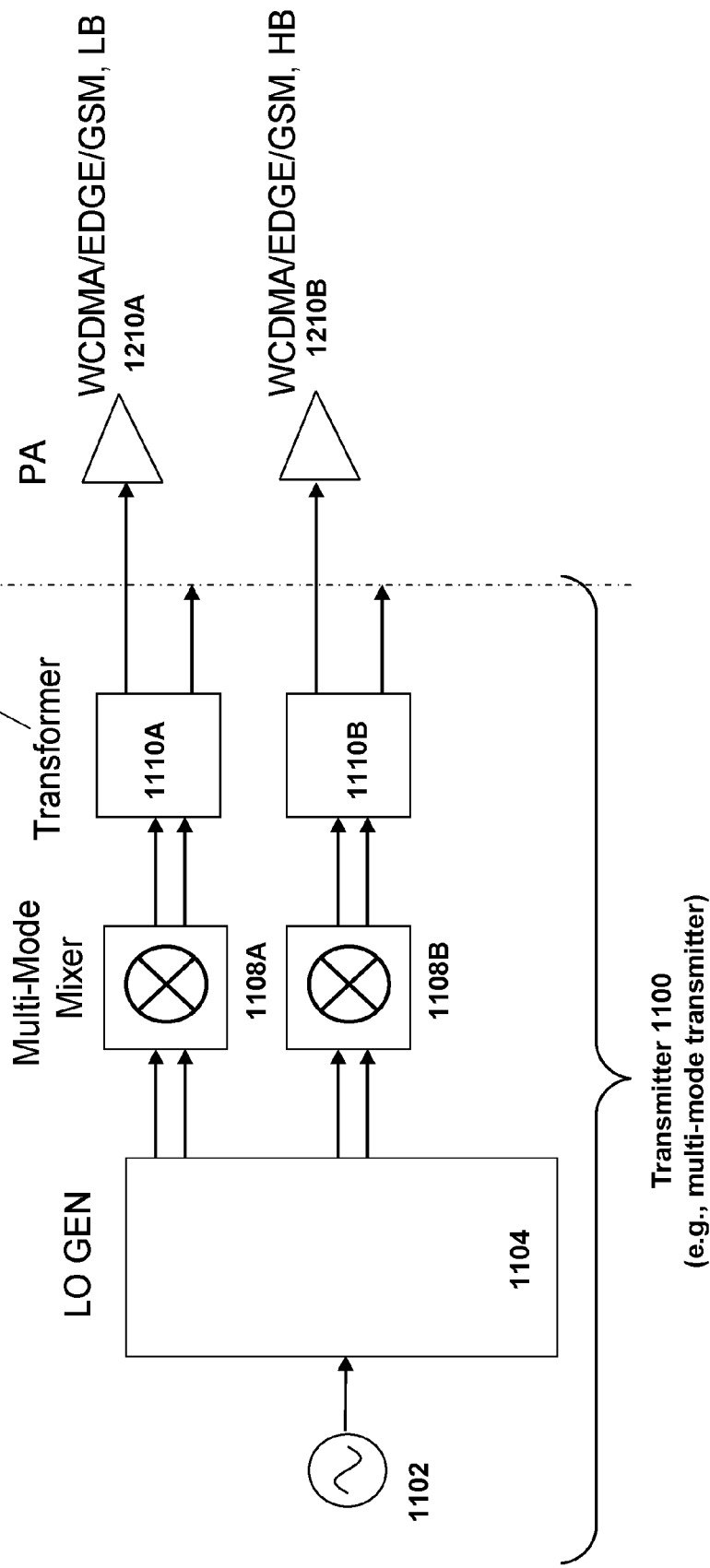
FIG. 12 is a block diagram illustrating a transmitter configured in a combined PA configuration for multiple bands according to an example embodiment.

FIG. 12 is a block diagram illustrating a transmitter configured in a combined PA configuration for multiple bands according to an example embodiment. As shown in FIG. 12, the transformers 1110A and 1110B are each configured in combined PA configuration, or to operate with a combined PA coupled to one of the outputs of the transformer for multiple modes, e.g., for GSM/EDGE, WCDMA, etc. Thus, one combined (or multi-mode) PA 1210A to amplify GSM/EDGE/WCDMA signals, low band (LB), is coupled to one output of transformer 1110A for LB, and one combined or multi-mode PA 1210B is coupled to an output of transformer 1110B to amplify GSM/EDGE, WCDMA signals, high band (HB).

According to an example embodiment, an apparatus may be provided that is configurable to operate in either a separate power amplifier configuration or a combined power amplifier configuration. The apparatus may include: a transformer including: a first transformer winding coupled to first and second differential inputs; and a second transformer winding coupled to a first single-ended output and a second single-ended output; a first switch coupled to the first single-ended output of the transformer; a second switch coupled to the second single-ended output of the transformer; wherein the transformer, while configured to operate in the separate power amplifier configuration, is configured to either output a signal associated with a first operating mode onto the first single-ended output of the transformer or output a signal associated with a second operating mode onto the second single-ended output of the transformer; and wherein the transformer, while configured to operate in the combined power amplifier configuration, is configured to output signals associated with the first operating mode and/or the second operating mode onto the first single-ended output of the transformer, and with the second single-ended output being unused.

In an example embodiment, the apparatus may further include a processor configured to control the first switch and the second switch to configure the transformer to operate in either the separate power amplifier mode or the combined power amplifier mode.

In an example embodiment, the first operating mode may include a WCDMA (Wide-Band Code Division Multiple Access) operating mode, and the second mode may include a GSM (Global System for Mobile communication) operating mode.

In an example embodiment, the second operating mode may include a WCDMA (Wide-Band Code Division Multiple Access) operating mode, and the first mode may include a GSM (Global System for Mobile communication) operating mode.

In an example embodiment, the first operating mode may include a WCDMA (Wide-Band Code Division Multiple Access) operating mode and/or HSUPA (High-Speed Uplink Packet Access) mode, and the second mode may include a GSM (Global System for Mobile communication) operating mode and/or EDGE (Enhanced Data Rates for GSM Evolution) operating mode.

In an example embodiment, the first and second switches may include a pair of complimentary transistors.

In an example embodiment, the apparatus may be configured to operate in the separate power amplifier configuration, the apparatus further including: a first power amplifier having an input coupled to the first single-ended output of the transformer, the first power amplifier configured to receive and amplify the signal associated with the first operating mode when present; and a second power amplifier having an input coupled to the second single-ended output of the transformer, the second power amplifier configured to receive and amplify the signal associated with the second operating mode when present.

In an example embodiment, the apparatus may be configured to operate in the combined power amplifier configuration, the apparatus further including: a power amplifier having an input coupled to the first single-ended output of the transformer, the power amplifier configured to output signals associated with the first operating mode and/or the second operating mode, whenever present.

In an example embodiment, the apparatus may further include a multimode mixer configured to output signals associated with the first operating mode and/or signals associated with the second operating mode, depending on the operating mode that is selected or configured for operation.

In an example embodiment, the transformer may include multiple transformers including at least:
- a first transformer configured to operate in either the combined power amplifier configuration or the separate power amplifier configuration for a first frequency band; and
- a second transformer configured to operate in either the combined power amplifier configuration or the separate power amplifier configuration for a second frequency band.

In an example embodiment, the apparatus may further include, when the apparatus is configured in the separate power amplifier configuration: a first power amplifier coupled to a first output of the first transformer and configured to receive and amplify the signal associated with the first operating mode when present; a second power amplifier coupled to a second output of the first transformer, the second power amplifier configured to receive and amplify the signal associated with the second operating mode when present; a third power amplifier coupled to a first output of the second transformer and configured to receive and amplify the signal associated with the first operating mode when present; and a fourth power amplifier coupled to a second output of the second transformer, the second power amplifier configured to receive and amplify the signal associated with the second operating mode when present.

The apparatus may further include, when the apparatus is configured in the combined power amplifier configuration: the first power amplifier coupled to the first output of the first transformer, the first power amplifier configured to output signals associated with the first operating mode and/or the second operating mode, whenever present, and with the second output of the first transformer being unused; and the second power amplifier coupled to the first output of the second transformer, the second power amplifier configured to output signals associated with the first operating mode and/or the second operating mode, whenever present, and with the second output of the second transformer being unused.

Figure 13:
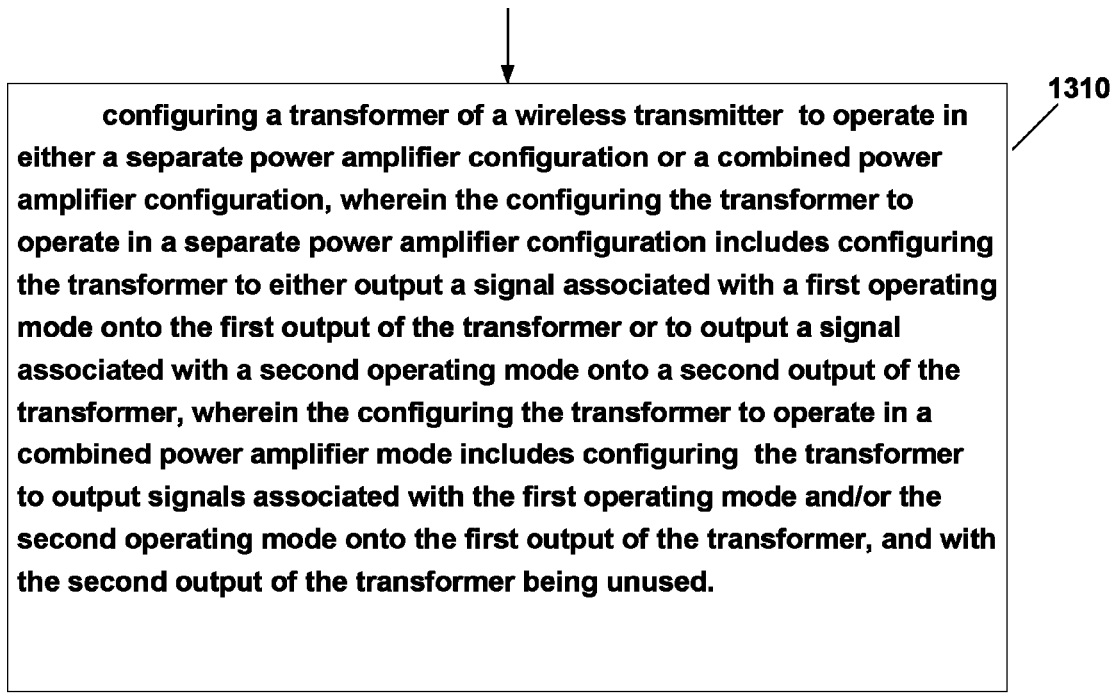
FIG. 13 is a flow chart according to an example embodiment.

FIG. 13 is a flow chart illustrating operation or configuration of a transmitter according to an example embodiment. Operation 1310 may include configuring a transformer of a wireless transmitter to operate in either a separate power amplifier configuration or a combined power amplifier configuration, wherein the configuring the transformer to operate in a separate power amplifier configuration includes configuring the transformer to either output a signal associated with a first operating mode onto the first output of the transformer or to output a signal associated with a second operating mode onto a second output of the transformer, wherein the configuring the transformer to operate in a combined power amplifier mode includes configuring the transformer to output signals associated with the first operating mode and/or the second operating mode onto the first output of the transformer, and with the second output of the transformer being unused.

In an example embodiment, operation 1310 may include configuring one or more switches within the transformer.

In an example embodiment of FIG. 13, the first operating mode may include at least a WCDMA (Wide-Band Code Division Multiple Access) operating mode, and the second mode may include at least a GSM (Global System for Mobile communication)/EDGE operating mode.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus configurable to operate in either a separate power amplifier configuration or a combined power amplifier configuration, the apparatus comprising:
    a transformer including:
    a first transformer winding coupled to first and second differential inputs; and
    a second transformer winding coupled to a first single-ended output and a second single-ended output;
    a first switch coupled to the first single-ended output of the transformer;
    a second switch coupled to the second single-ended output of the transformer;
    wherein the transformer, while configured to operate in the separate power amplifier configuration, is configured to either output a signal associated with a first operating mode onto the first single-ended output of the transformer or output a signal associated with a second operating mode onto the second single-ended output of the transformer; and
    wherein the transformer, while configured to operate in the combined power amplifier configuration, is configured to output signals associated with the first operating mode and/or the second operating mode onto the first single-ended output of the transformer, and with the second single-ended output being unused.

2. The apparatus of claim 1 wherein the apparatus further comprises a processor configured to control the first switch and the second switch to configure the transformer to operate in either the separate power amplifier mode or the combined power amplifier mode.

3. The apparatus of claim 1 wherein the first operating mode comprises a WCDMA (Wide-Band Code Division Multiple Access) operating mode, and the second mode comprises a GSM (Global System for Mobile communication) operating mode.

4. The apparatus of claim 1 wherein the second operating mode comprises a WCDMA (Wide-Band Code Division Multiple Access) operating mode, and the first mode comprises a GSM (Global System for Mobile communication) operating mode.

5. The apparatus of claim 1 wherein the first operating mode comprises a WCDMA (Wide-Band Code Division Multiple Access) operating mode and/or HSUPA (High-Speed Uplink Packet Access) mode, and the second mode comprises a GSM (Global System for Mobile communication) operating mode and/or EDGE (Enhanced Data Rates for GSM Evolution) operating mode.

6. The apparatus of claim 1 wherein the first and second switches comprise a pair of complimentary transistors.

7. The apparatus of claim 1, wherein the apparatus is configured to operate in the separate power amplifier configuration, the apparatus further comprising:
a first power amplifier having an input coupled to the first single-ended output of the transformer, the first power amplifier configured to receive and amplify the signal associated with the first operating mode when present; and
a second power amplifier having an input coupled to the second single-ended output of the transformer, the second power amplifier configured to receive and amplify the signal associated with the second operating mode when present.

8. The apparatus of claim 1, wherein the apparatus is configured to operate in the combined power amplifier configuration, the apparatus further comprising:
a power amplifier having an input coupled to the first single-ended output of the transformer, the power amplifier configured to output signals associated with the first operating mode and/or the second operating mode, whenever present.

9. The apparatus of claim 1 and further comprising a multimode mixer configured to output signals associated with the first operating mode and/or signals associated with the second operating mode, depending on the operating mode that is selected or configured for operation.

10. The apparatus of claim 1 wherein the transformer comprises multiple transformers including at least:
a first transformer configured to operate in either the combined power amplifier configuration or the separate power amplifier configuration for a first frequency band; and
a second transformer configured to operate in either the combined power amplifier configuration or the separate power amplifier configuration for a second frequency band.

11. The apparatus of claim 10 and further comprising, when the apparatus is configured in the separate power amplifier configuration:
a first power amplifier coupled to a first output of the first transformer and configured to receive and amplify the signal associated with the first operating mode when present;
a second power amplifier coupled to a second output of the first transformer, the second power amplifier configured to receive and amplify the signal associated with the second operating mode when present;
a third power amplifier coupled to a first output of the second transformer and configured to receive and amplify the signal associated with the first operating mode when present; and
a fourth power amplifier coupled to a second output of the second transformer, the second power amplifier configured to receive and amplify the signal associated with the second operating mode when present.

12. The apparatus of claim 10, and further comprising, when the apparatus is configured in the combined power amplifier configuration:
the first power amplifier coupled to the first output of the first transformer, the first power amplifier configured to output signals associated with the first operating mode and/or the second operating mode, whenever present, and with the second output of the first transformer being unused; and
the second power amplifier coupled to the first output of the second transformer, the second power amplifier configured to output signals associated with the first operating mode and/or the second operating mode, whenever present, and with the second output of the second transformer being unused.

13. A method comprising:
configuring a transformer of a wireless transmitter to operate in either a separate power amplifier configuration or a combined power amplifier configuration, wherein the configuring the transformer to operate in a separate power amplifier configuration includes configuring the transformer to either output a signal associated with a first operating mode onto the first output of the transformer or to output a signal associated with a second operating mode onto a second output of the transformer, wherein the configuring the transformer to operate in a combined power amplifier mode includes configuring the transformer to output signals associated with the first operating mode and/or the second operating mode onto the first output of the transformer, and with the second output of the transformer being unused.

14. The method of claim 13 wherein the configuring comprises configuring one or more switches within the transformer.

15. The method of claim 13 wherein the first operating mode comprises at least a WCDMA (Wide-Band Code Division Multiple Access) operating mode, and the second mode comprises at least a GSM (Global System for Mobile communication)/EDGE operating mode.

16. An apparatus configurable to operate in either a separate power amplifier configuration or a combined power amplifier configuration, the apparatus comprising:
a transformer;
wherein the transformer, while configured to operate in the separate power amplifier configuration, is configured to either output a signal associated with a first operating mode onto a first single-ended output of the transformer or output a signal associated with a second operating mode onto a second single-ended output of the transformer; and
wherein the transformer, while configured to operate in the combined power amplifier configuration, is configured to output signals associated with the first operating mode and/or the second operating mode onto the first single-ended output of the transformer, and with the second single-ended output being unused.

17. The apparatus of claim 16 wherein the first operating mode comprises a WCDMA (Wide-Band Code Division Multiple Access) operating mode and/or HSUPA (High-Speed Uplink Packet Access) mode, and the second mode comprises a GSM (Global System for Mobile communication) operating mode and/or EDGE (Enhanced Data Rates for GSM Evolution) operating mode.

18. The apparatus of claim 16, wherein the apparatus is configured to operate in the separate power amplifier configuration, the apparatus further comprising:

a first power amplifier having an input coupled to the first single-ended output of the transformer, the first power amplifier configured to receive and amplify the signal associated with the first operating mode when present; and a second power amplifier having an input coupled to the second single-ended output of the transformer, the second power amplifier configured to receive and amplify the signal associated with the second operating mode when present.

* * * * *

UNITED STATES PATENT AND TRADEMARK OFFICE
CERTIFICATE OF CORRECTION

PATENT NO.         : 8,280,325 B2                                          Page 1 of 1
APPLICATION NO.    : 12/395014
DATED              : October 2, 2012
INVENTOR(S)        : Alireza Zolfaghari It is certified that error appears in the above-identified patent and that said Letters Patent is hereby corrected as shown below:

On cover page, item (56), under "OTHER PUBLICATIONS", in column 2, line 5, after "filed" insert -- on --.

On cover page, item (56), under "OTHER PUBLICATIONS", in column 2, line 7, after "filed" insert -- on --.

Signed and Sealed this
Twenty-ninth Day of January, 2013

David J. Kappos
*Director of the United States Patent and Trademark Office*